United States Patent [19]
May

[11] Patent Number: 4,933,046
[45] Date of Patent: Jun. 12, 1990

[54] WATER PURIFYING SYSTEM

[75] Inventor: Wayne A. May, Hayward, Calif.

[73] Assignee: Hydronix Corporation, Plantation, Fla.

[21] Appl. No.: 243,229

[22] Filed: Sep. 6, 1988

Related U.S. Application Data

[63] Continuation of Ser. No. 876,118, Jun. 19, 1986, abandoned.

[51] Int. Cl.⁵ ............................................. B01D 3/00
[52] U.S. Cl. ...................... 202/185.3; 159/DIG. 15; 159/DIG. 42; 165/46; 165/905; 202/267.1; 202/269; 203/10; 203/86; 203/100
[58] Field of Search ............... 202/185.3, 235, 267.1, 202/269; 203/100, 10, 86; 165/46, 905, DIG. 8; 159/DIG. 15, DIG. 42

[56] References Cited

U.S. PATENT DOCUMENTS

| | | | |
|---|---|---|---|
| 2,595,328 | 5/1952 | Bowen | 165/46 |
| 3,168,450 | 2/1965 | Black | 202/185.1 |
| 3,214,348 | 10/1965 | Lichtenstein | 202/185.1 |
| 3,227,630 | 1/1966 | Beckman | 165/46 |
| 3,408,260 | 10/1968 | Feldman et al. | 203/10 |
| 3,765,981 | 10/1973 | Rodgers | 203/10 |
| 3,925,167 | 12/1975 | Rodgers | 203/10 |
| 4,045,293 | 8/1977 | Cookaly | 202/185.1 |
| 4,141,798 | 2/1979 | Grosse | 203/10 |
| 4,212,347 | 7/1980 | Eastman | 165/46 |
| 4,478,685 | 10/1984 | Mortenson | 202/267 R |

FOREIGN PATENT DOCUMENTS

| | | | |
|---|---|---|---|
| 2816233 | 10/1979 | Fed. Rep. of Germany | 203/10 |
| 3040987 | 5/1982 | Fed. Rep. of Germany | 165/46 |
| 3404312 | 8/1985 | Fed. Rep. of Germany | 165/46 |
| 2112006 | 6/1972 | France | 165/46 |
| 2289870 | 5/1976 | France | 165/46 |
| 0075664 | 6/1977 | Japan | 203/10 |
| 0025687 | 3/1981 | Japan | 165/46 |
| 0069491 | 4/1985 | Japan | 165/46 |
| 0248204 | 12/1985 | Japan | 202/185.1 |
| 1313300 | 4/1973 | United Kingdom | 165/46 |

Primary Examiner—Virginia Manoharan
Attorney, Agent, or Firm—Duckworth, Allen, Dyer & Doppelt

[57] ABSTRACT

A water purifying system having a condenser made of two superposed sheets of hydrophobic plastic film bonded together to form a tortuous steam path through the condenser. As steam enters the condenser it is cooled by the ambient air, condensed into water and then removed from the condenser.

8 Claims, 3 Drawing Sheets

WATER PURIFYING SYSTEM

This application is a continuation of application Ser. No. 876,118, filed 6-19-86.

BACKGROUND OF THE INVENTION

This inventionn relates to an improved system for purifying drinking water.

Water purifying systems of the type with which the present invention is concerned act as fractionary stills. Stills boil impure water to separate the impurities from the water. Some impurities typically found in tap water boil at temperatures higher than water while other impurities boil at temperatures lower than water. A fractionary still boils impure water within a heating tank to the point of saturated steam, then transports the steam through a condenser which cools the steam to a liquid state. Since the impurities which boil at a higher temperature than water are not vaporized with the steam, they remain in the heating tank and are thus separated from the water. Additionally, any dissolved or undissolved solids or heavy metals which do not boil at all remain in the heating tank and are also separated.

The prior art condensers have typically consisted of stainless steel or aluminum tubing, bent in the form of a helix. Steam passing through the tubing is cooled to a liquid state by the forced convection of air passing over the tubing. One disadvantage of using metal tubing is that the tubing is not very hydrophobic. Condensed water accumulates on the inside of the tubing and actually insulates the steam from the cooling air. As a result, the efficiency of the condenser is reduced. Additionally, the overall cost of the condenser is relatively expensive since a fan or some other device must be provided for blowing air across the condenser to cool the steam.

Prior patents pertaining to the use of various types of plastic materials bonding together to form heat transfer devices include: U.S. Pat. No. 3,830,676 to Elkins; U.S. Pat. No. 4,118,946 to Tubin; U.S. Pat. No. 4,212,347 to Eastman; and U.S. Pat. No. 4,480,635 to Ostrovsky.

SUMMARY OF THE INVENTION

The present invention teaches a system for purifying drinking water having a boiling vessel, a condenser and a receiving vessel. The boiling vessel has heating means for boiling the impure water. A conduit for transporting steam from the boiling vessel to the condenser is attached at one end to an opening in the top of the boiling vessel and attached at the other end to a steam inlet at the top of the condenser. A second conduit, for transporting the purified water from the condenser to the receiving vessel, is attached at one end to a liquid outlet at the bottom of the condenser and attached at the other end to an opening at the top of the receiving vessel.

The condenser comprises two superposed sheets of flexible plastic material bonded together to form a closed tortuous path between the two sheets. Steam enters a steam inlet at the top of the tortuous path, is cooled through free convection of air passing over the condenser, and condenses into purified water. The purified water is then removed from the condenser by way of an outlet at the bottom of the tortuous path.

The condenser is preferably made from polyester material because of the hydrophobic nature of polyester. As the air cools the steam, condensation forms on the interior walls of the patch. Since the polyester film lacks an affinity toward water, the cohesiveness of water to itself is stronger than the cohesiveness of water to polyester. Water droplets on the sidewalls within the tortuous path drip downward into an adjacent horizontal channel. Because of the hydrophobic nature of the polyester, the water droplets which drip into the horizontal channel cling to each other to form a larger globular-shaped water mass. The water mass is forced along the tortuous path by the flowing steam and wipes the condensed steam from the inside walls of the condenser. This wiping action increases the thermal conductivity of the condenser. Additionally, the tensile strength of polyester film is much greater than the tensile strength of stainless steel or aluminum. Thus the wall thickness of a polyester condenser can be significantly less than the wall thickness of an aluminum or stainless steel condenser to additionally increase the thermal conductivity of the condenser.

Another advantage of a condenser made from polyester film is that a polyester condenser is significantly less expensive than a stainless steel or aluminum condenser. Because of the increased thermal conductivity of the polyester condenser a fan is not needed to force cooling air across the condenser. Also, polyester film is much less expensive than aluminum or stainless steel tubing.

BRIEF DESCRIPTION OF THE DRAWINGS

The foregoing and other objects features and advantages will become more apparent by reference to the following detailed description, taken in conjunction with the accompanying drawings in which.

DESCRIPTION OF THE PREFERRED EMBODIMENT

Figure 1:
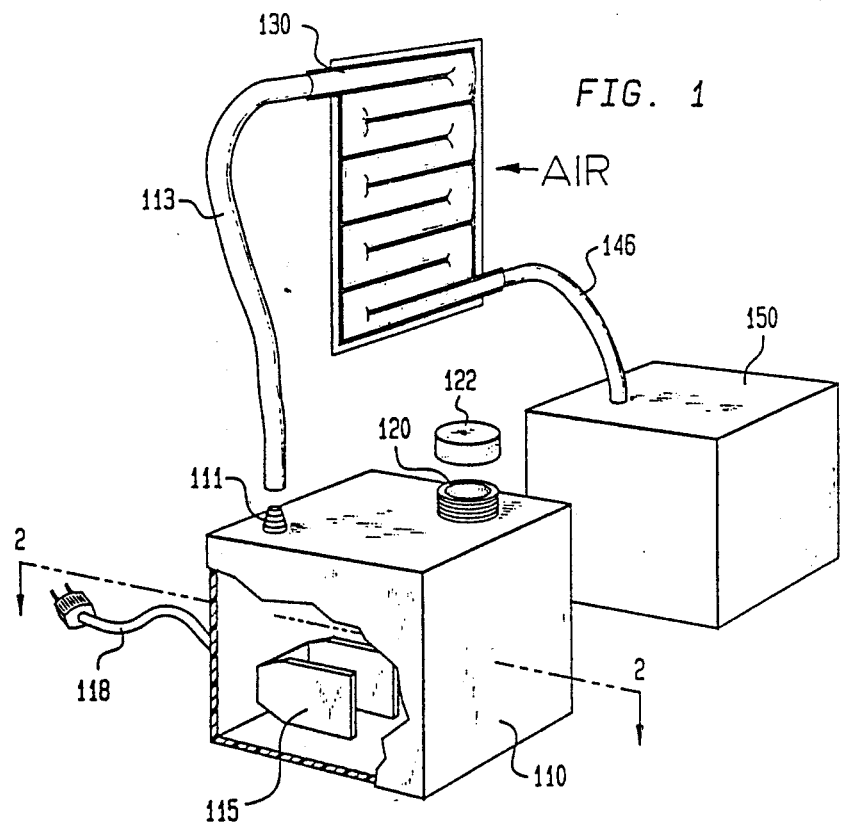
FIG. 1 is a perspective view of a system for purifying water in accordance with the present invention.

Referring to FIG. 1, a portable system for purifying drinking water 10 of the present invention is shown with a boiling vessel 110 to heat the water from a liquid state to a saturated steam state, a condenser 130 for condensing the steam into purified water, and a receiving vessel 150 for receiving the purified water.

Figure 2:
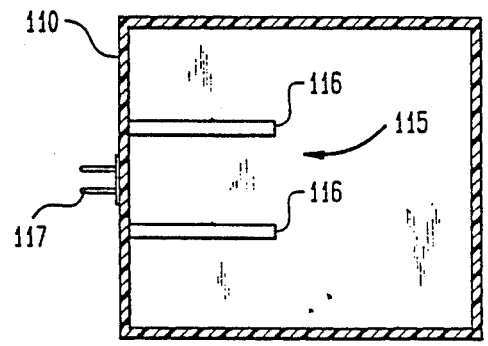
FIG. 2 is a section view II—II of FIG. 1 illustrating a heating element.

Referring now to FIG. 2, the boiling vessel 110 is a high temperature thermal plastic closed container which has an electrical heating element 115, well known in the art, for boiling the impure water. The heating element 115, located near the bottom of the boiling vessel 110, has two parallel heating plates 116 which pass an A.C. current through the water in order to heat the water. A two pronged male electrical plug 117, with a prong wired to each plate 116, is provided through the bulkhead of the boiling vessel 110 to receive the female end of an AC power cable 118 attached to an AC power source (not shown). In the preferred embodiment the boiling vessel 110 is a single walled construction capable of withstanding a pressure of four (4) inches of water at 130° F.

Referring again to FIG. 1, a hollow cylindrical male fixture 111 protrudes from the top of the boiling vessel 110. The male fixture 111 is adapted with a barbed external surface to receive one end of a plastic tube 113 with the other end of the tube 113 adapted to attach to the condenser 130, in a manner well known in the art, so that the tube 113 transports the steam from the boiling vessel 110 to the condenser 130. Additionally, an opening 120 is provided in the top of the boiling vessel 110 large enough to allow the vessel 110 to be cleaned or filled with water yet too small to permit a hand to fit through the opening 120. The opening 120 is covered by a cap 122, in a manner well known in the art, to seal the opening 120.

Figure 3:
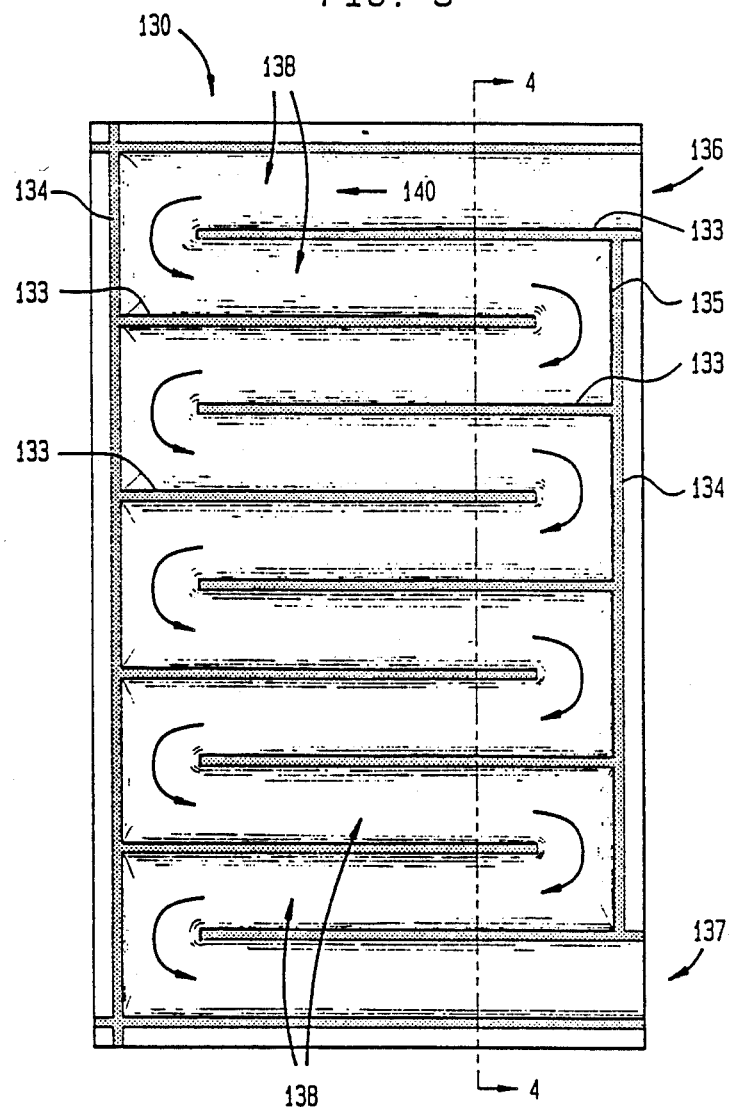
FIG. 3 is a plan view of a condenser in accordance with the present invention.
Figure 4:
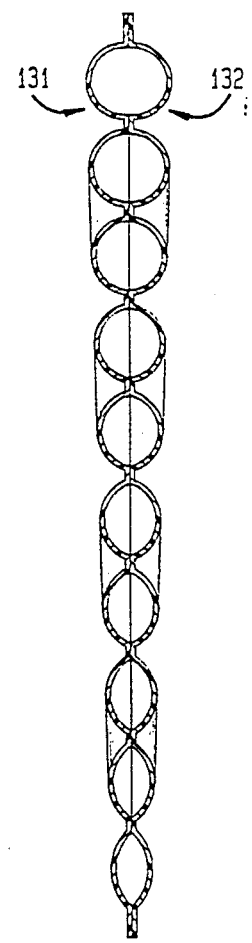
FIG. 4 is a section view of IV—IV of FIG. 3 illustrating the attachment of two superposed sheets of polyester film.

Reference is now made to FIGS. 3 and 4 which show two superposed sheets 131 and 132 of hydrophobic plastic film preferably polyester film, bonded together to form a closed tortuous steam path 140 through the condenser 130. The tortuous path 140 is formed by a plurality of horizontal seals 133 alternately connected normal to opposite vertical side seals 134 with the horizontal seals 133 defining horizontal channels 138 and the vertical side seals 134 defining internal vertical side walls 135 at each bend in the tortuous path 140. The tortuous path 140 has a steam inlet opening 136 at its top end connected to the tube 113 which transports steam from the boiling vessel 110 to the condenser 130 and a liquid water outlet opening 137 at its bottom end for removing the condensed water from the condenser 130. The path 140 thus defines a plurality of horizontal channels 138 disposed one above the other and joined at ends to define a plurality of loops descending in series from the inlet opening 136 to the outlet opening 137 along the closed path 140. The bonded sheets 131 and 132 and path 140 are adapted, configured and dimensioned so that a heat-transfer fluid passing over the sheets 131 and 132, such as convective currents of air, will condense steam into purified water, as further described below, that can be removed at the outlet opening 137. In the preferred embodiment of the present invention, the polyester sheets 131 and 132 are each 0.00075 inches thick. Additionally, the bonds are electrically heat welded with the width of each seal being approximately 0.125 inches.

Figure 5:
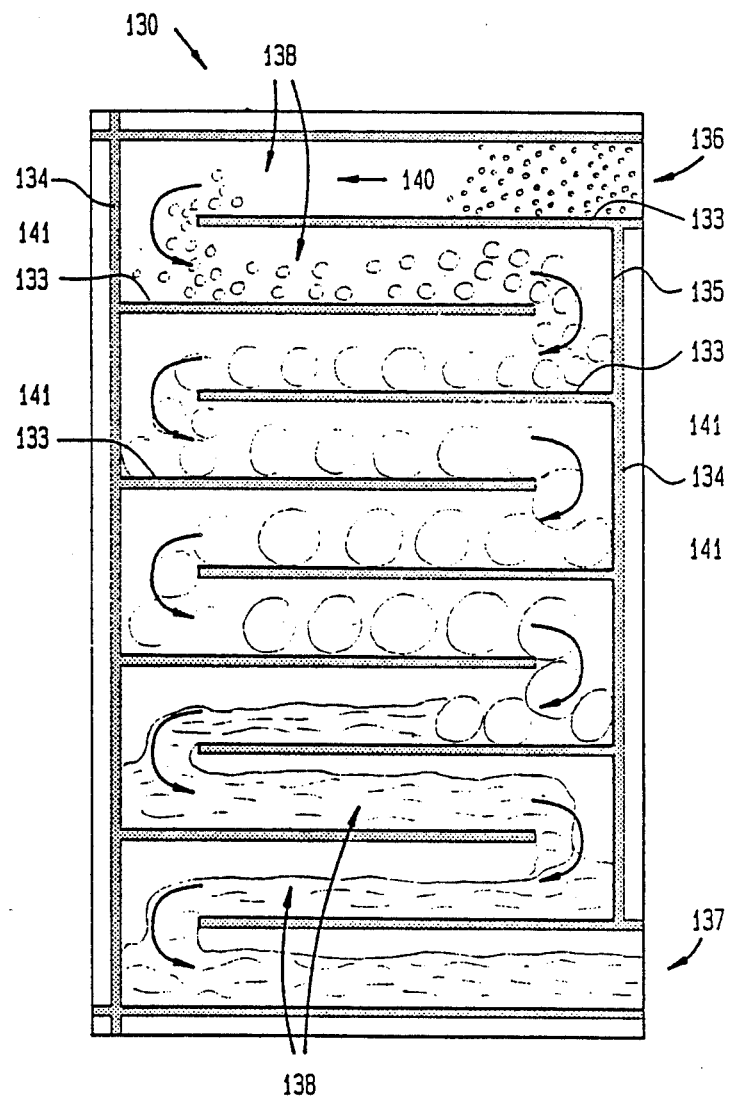
FIG. 5 is a plan view of a condenser in accordance with the present invention illustrating steam condensing within the tortuous path.

Reference is now made to FIG. 5 which shows condensed water flowing through the condenser. As steam passes through the condenser 130 small water droplets form on the vertical side walls and horizontal channels 138 defined by the tortuous path 140. Due to gravitational forces, the water droplets which form on the vertical side walls 135 of the tortuous path drip downward into the adjacent horizontal channels 138. Since the water lacks an affinity toward the polyester film, the water droplets which drip into the horizontal channels 138 tend to cling to each other rather than to the polyester condenser 130 to form larger globular-shaped water masses 141. The globular masses 141 are forced along the horizontal channels 138 by the steam flowing through the condenser 130 and effectively wipe the condensed water droplets from the horizontal channels 138. When a globular mass 141 reaches the end of a horizontal channel 138, it falls to a lower adjacent horizontal channel 138, bursts by the impact of the fall and forms a plurality of smaller globular masses 141. This particular geometry greatly increases the overall thermal conductivity of the condenser 130 by causing the condensed water to continually wipe itself clear from the inside surface defined by the tortuous path 140 and also by causing a turbulent steam flow through the condenser 130. Thus the condenser 130 can be small without a need for forced convection. In one embodiment of the present invention, the condenser is in the form of a rectangle fifteen inches tall and twelve inches wide with the horizontal seals 133 spaced one inch apart.

Referring again to FIG. 1 it is shown that one end of a thermal plastic tube 146 is attached to the liquid water outlet 137 with the other end of the tube 146 attached to the receiving vessel 150 to transport purified water from the condenser 130 to the receiving vessel 150. The tube 146 is attached to the condenser 130 and to the receiving vessel 150 in a manner well known in the art.

While the principals of the invention have now been made clear in an illustrative embodiment, there will become obvious to those skilled in the art many modifications in structure, arrangement, materials and components used in the practice of the invention and otherwise which are particularly adapted for specific operating requirements without departing from those principals. For example, the seals could be bonded with an adhesive or ultrasonic seal rather than electrical heat sealing. The appended claims are therefore intended to cover and embrace any such modifications, within the limits only of the true spirit and scope of the invention.

I claim:

1. A system for purifying drinking water comprising:
   (a) a boiling vessel;
   (b) a heating element within said boiling vessel for heating water within said vessel to form steam;
   (c) a condenser including two superposed sheets of flexible hydrophobic plastic material bonded together at opposite faces to form a closed tortuous path between the sheets, an upper inlet opening, a lower outlet opening, and a plurality of horizontal channels disposed one above the other and joined at ends to define a plurality of loops descending in series from said inlet to said outlet opening along said closed path;
   (d) said two sheets of flexible plastic comprising a polyester film, the bonding of the two sheets of polyester film comprising two vertical side seals which bond opposite edges of said two superimposed sheets and a plurality of horizontal seals, alternately connected normal to said vertical side seals;
   (e) means for transporting steam from said boiling vessel to said inlet opening of said condenser;
   (f) means for passing convection flow of ambient air over said sheets so as to condense the steam transported to said inlet opening into purified water droplets on said opposing faces within said channels wherein said droplets will drip down due to gravitational action into adjacent channels and pass to said outlet opening;
   (g) a receiving vessel; and
   (h) means for transporting said purified water from said condenser outlet opening to said receiving vessel.

2. A system for purifying water according to claim 1 wherein said means for transporting the steam from said boiling vessel to said condenser inlet opening comprises a thermal plastic tubing, one end of which is connected to said boiling vessel, and the other end of which is connected to said condenser.

3. A system for purifying water according to claim 2 wherein said means for transporting the purified water from said condenser outlet opening to said receiving vessel comprises a plastic tubing, one end of which is attached to said condenser, and the other end of which is attached to said receiving vessel.

4. A system for purifying water according to claim 1 wherein said superposed sheets are each 0.00075 inches thick.

5. A system for purifying water according to claim 4 wherein said vertical and horizontal seals are welds formed by electrically heat welding said sheets, with each seal having a width of approximately 0.125 inches.

6. A system for purifying water according to claim 1 wherein said vertical and horizontal seals are formed by heat sealing said superposed sheets.

7. A system for purifying water according to claim 1 wherein said superposed sheets are bonded together by an adhesive.

8. A system for purifying water according to claim 1 wherein said boiling vessel comprises a thermal plastic container.

* * * * *